United States Patent [19]
Journee

[11] Patent Number: 5,729,861
[45] Date of Patent: Mar. 24, 1998

[54] MOTOR VEHICLE SCREEN WIPER HAVING MEANS FOR TRANSVERSELY GUIDING THE SCREEN WIPER BLADE WITH RESPECT TO THE WIPER ARM

[75] Inventor: Maurice Journee, Reilly, France

[73] Assignee: Paul Journee S.A., Reilly, France

[21] Appl. No.: 414,121

[22] Filed: Mar. 20, 1995

[30] Foreign Application Priority Data

Mar. 23, 1994 [FR] France ................... 94 03412

[51] Int. Cl.$^6$ .................... B60S 1/32; B60S 1/04
[52] U.S. Cl. .................... 15/250.351; 15/250.44; 15/250.32; 15/250.31
[58] Field of Search .............. 15/250.351, 250.32, 15/250.23, 250.41, 250.31, 250.21, 250.13, 250.33, 250.361, 250.44, 250.48, 250.43

[56] References Cited

U.S. PATENT DOCUMENTS

| | | | |
|---|---|---|---|
| 1,099,143 | 6/1914 | Tracy | 15/250.32 |
| 1,248,795 | 12/1917 | Beitman | 15/250.32 |
| 1,641,683 | 9/1927 | Malouf | 15/250.351 |
| 5,206,969 | 5/1993 | Patterson et al. | 15/250.201 |

FOREIGN PATENT DOCUMENTS

| | | | |
|---|---|---|---|
| 311471 | 4/1989 | European Pat. Off. | 15/250.201 |
| 2642026 | 7/1990 | France | 15/250.46 |
| 2679186 | 1/1993 | France | 15/250.201 |
| 3744237 | 7/1989 | Germany | 15/250.351 |
| 3914629 | 11/1989 | Germany | 15/250.32 |
| 3829343 | 3/1990 | Germany | 15/250.46 |

*Primary Examiner*—Gary K. Graham
*Attorney, Agent, or Firm*—Morgan & Finnegan, L.L.P.

[57] ABSTRACT

A motor vehicle screen wiper comprises a screen wiper blade which is articulated on one end of a screen wiper arm having an end portion. The end portion has, in a transverse cross section through a plane substantially at right angles to the direction of the length of the screen wiper arm, an inverted U shape. It is arranged to straddle, at least partially, a part of the screen wiper blade. The end portion of the screen wiper arm includes means for transversely guiding the wiper blade with respect to the wiper arm.

8 Claims, 2 Drawing Sheets

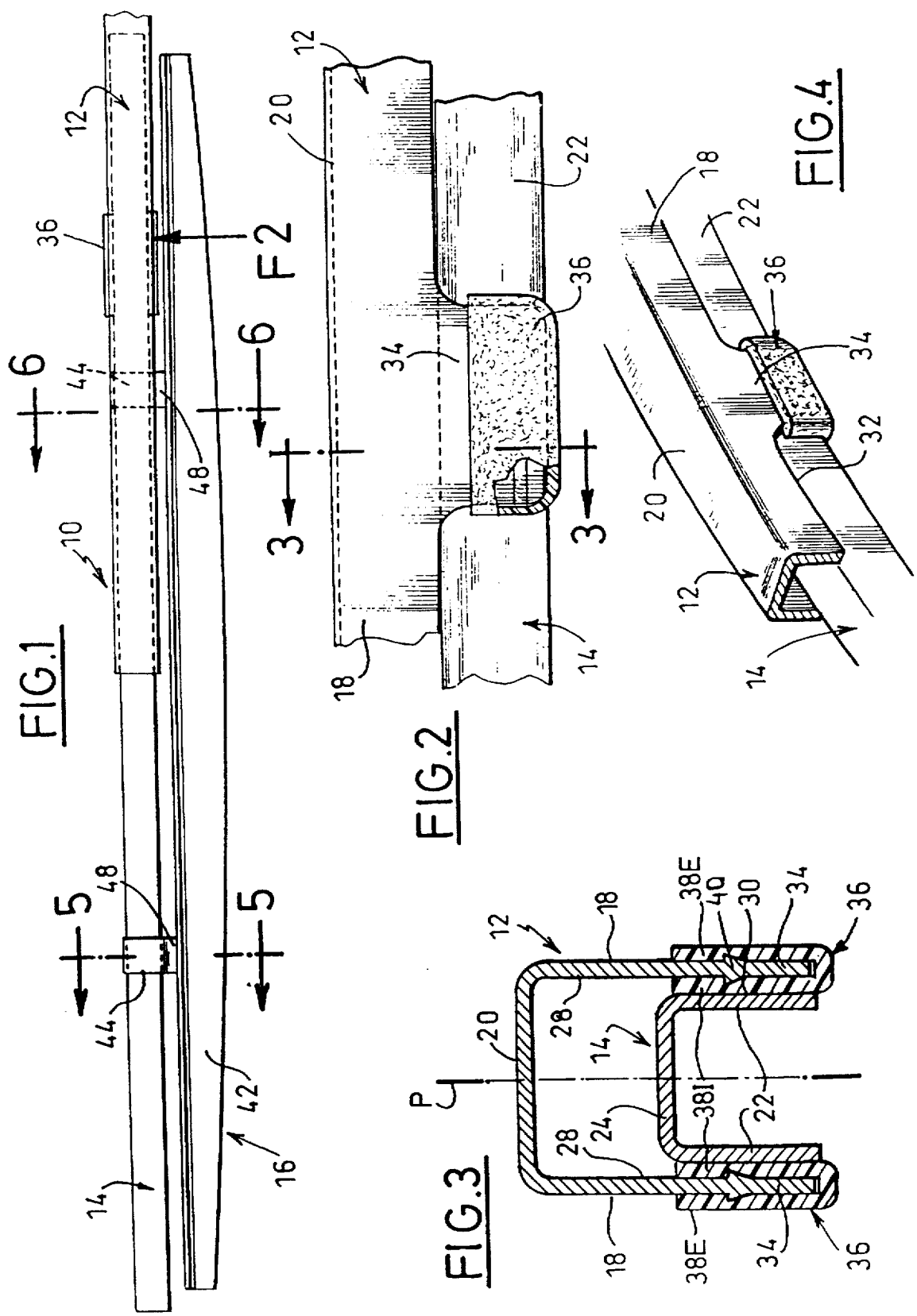

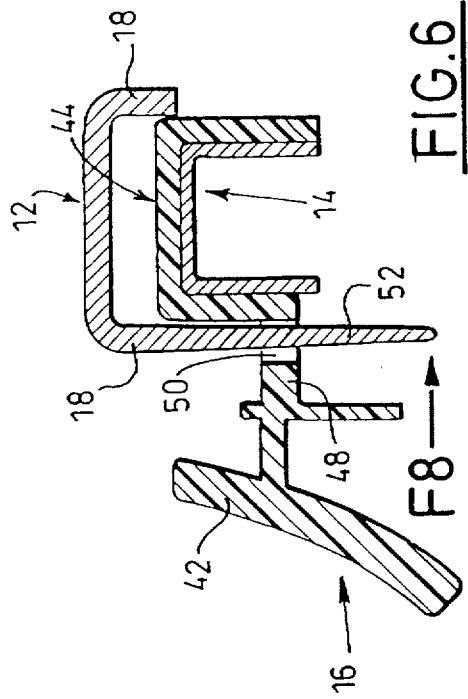
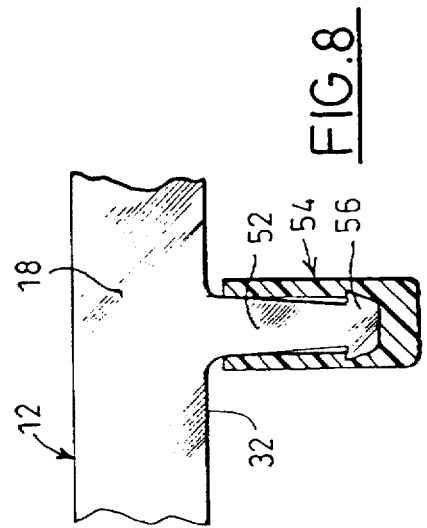
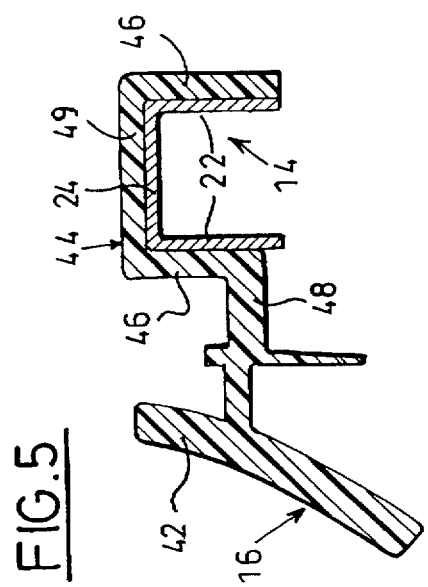
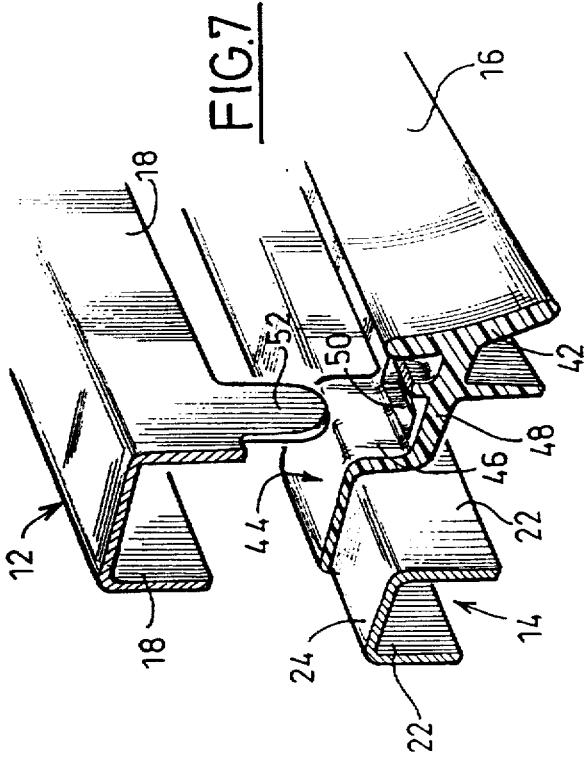

MOTOR VEHICLE SCREEN WIPER HAVING MEANS FOR TRANSVERSELY GUIDING THE SCREEN WIPER BLADE WITH RESPECT TO THE WIPER ARM

FIELD OF THE INVENTION

The present invention relates to a motor vehicle screen wiper. More particularly, the invention is directed to a screen wiper of the type comprising a screen wiper blade which is articulated on an end portion of a screen wiper arm, the end portion having a transverse cross section, through a plane substantially at right angles to the general direction of the screen wiper arm, in the form of an inverted U, and being arranged to straddle, at least partly, a part of the screen wiper blade. The term "screen wiper" as used in this Application is to be understood to refer to a wiper for wiping a glass surface, typically, though not necessarily, the windshield of the vehicle.

BACKGROUND OF THE INVENTION

In such a design, when the above mentioned part of the screen wiper blade is straddled by the end portion of the wiper arm, that is to say when side wing portions of the end portion of the wiper arm are arranged on either side of the side portions of the appropriate portion of the screen wiper blade, the deformation of the various components, and the vibrations to which they are subjected in operation, give rise to shocks or impact forces between those elements of the wiper blade and wiper arm that lie in facing relationship to each other. Unpleasant noise is thus set up, which is uncomfortable for the occupants of the vehicle.

DISCUSSION OF THE INVENTION

An object of the present invention is to propose a new design of screen wiper which overcomes the above mentioned drawback.

According to the invention, a motor vehicle screen wiper of the kind comprising a screen wiper blade which is articulated on to an end portion of a screen wiper blade, the end portion of which has, in transverse cross section on a plane substantially at right angles to the direction fin which the screen wiper arm extends; the form of an inverted U, and which is arranged to straddle, at least partially, a portion of the screen wiper blade, the end portion of the screen wiper arm comprising transverse guide means for guiding the screen wiper blade with respect to the screen wiper arm, is characterised in that the end portion of the screen wiper arm comprises two parallel side wing portions, at lease, one of which carries a guide element for transverse guidance of the screen wiper blade, the guide element being interposed between, on the one hand, an inner surface of the side wing portion of the end portion of the screen wiper arm and, on the other hand, a surface portion, in facing relationship with the inner surface, of the appropriate portion of the screen wiper blade.

According to a preferred feature of the invention, the guide element comprises one of the two parallel faces of a guide channel member which straddles the free inner edge of the corresponding side wing portion of the end portion of the screen wiper arm.

According to another preferred feature of the invention, the guide element is carried by an extension of the side wing portion of the screen wiper arm, which extends from the free lower edge of the latter.

According to a further preferred feature of the invention, the screen wiper further includes hook means for attachment of the guide element on the side wing portion of the screen wiper arm.

According to yet another preferred feature of the invention, the end portion has a symmetry of design with respect to a median longitudinal plane, and in that each of the side wing portions of the end portion carries a guide element.

According to a still further preferred feature of the invention, the screen wiper further includes an aerodynamic deflector which extends longitudinally over at least part of the length of the screen wiper blade, and which includes at least one transverse fastening yoke which straddles the screen wiper blade, the yoke being arranged in facing relationship with the end portion of the screen wiper arm, and the transverse guide means being arranged between the screen wiper arm and the aerodynamic deflector.

Preferably in the latter case, the transverse guide means comprise a guide finger which extends from the end portion of the screen wiper arm, and which is received in a guide hole formed in a lug which connects the fastening yoke to the body of the aerodynamic deflector.

Preferably, the end portion of the screen wiper arm then comprises two parallel side wing portions, and the guide finger projects from the free lower edge of one of the side wing portions. A sheath of sound deadening material then preferably covers the guide finger.

According to another preferred feature of the invention, where an aerodynamic deflector and a fastening yoke, as defined above, are present, the aerodynamic deflector preferably includes at lease one second transverse fastening yoke which straddles the screen wiper blade, and the two yokes are arranged on either side of the central portion of the deflector.

According to yet another preferred feature of the invention, the aerodynamic deflector has in its central part, firstly, disconnectable connecting means of the screen wiper blade, and secondly, articulating means of the screen wiper arm.

Further features and advantages of the invention will appear more clearly on a reading of the detailed description which follows, in which some preferred embodiments of the invention are described by way of example only and with reference to the accompanying drawings.

BRIEF DESCRIPTION OF THE DRAWINGS

FIG. 1 is a diagrammatic top view of the main components of a screen wiper in a first embodiment in accordance with tile invention.

FIG. 2 is a side view on a larger scale, seen in the direction of the arrow F2 in FIG. 1.

FIG. 3 is a view in cross section taken on the line 3—3 in FIG. 2.

FIG. 4 is a detail perspective view showing the transverse guide means.

FIG. 5 is a view in cross section taken on the line 5—5 in FIG. 1.

FIG. 6 is a view in cross section taken on the line 6—6 in FIG. 1, and shows a second embodiment of the transverse guide means arranged between the screen wiper arm and the aerodynamic deflector.

FIG. 7 is a detail perspective view of the transverse guide means in this second embodiment of the invention.

FIG. 8 is a detailed side view as seen in the direction of the arrow F8 in FIG. 6, and shows a modified embodiment of the guide finger.

DESCRIPTION OF PREFERRED EMBODIMENTS OF THE INVENTION

FIG. 1 shows an end portion of a screen wiper 10, which consists essentially of the end portion 12 of a screen wiper arm 11, together with a wiper blade 14 and an aerodynamic deflector 16.

As can be seen, in particular, in FIG. 3 to which reference is here made, the end portion 12 of the wiper arm is a component made of pressed sheet metal, and has a transverse cross section substantially in the form of an inverted U. This cross section comprises two parallel side wing portions 18 which are joined together by a horizontal spine portion 20.

Reference is now made also to FIG. 4, in which the main element of the wiper blade 14, which is the only component of the latter shown in the drawings and which may also be referred to as the main bridge, is again a component made of pressed sheet metal. It again has a cross section which is substantially in the form of an inverted U, consisting of two parallel side portions 22 which are joined together by a horizontal spine portion 24 at the top. The wiper blade 14 is articulated in its middle portion on the free end of the end portion 12 of the windshield wiper arm, by means which are not shown in the drawings. These articulating means enable the wiper blade 14 to pivot with respect to the arm end portion 12, about a pivot axis which is substantially at right angles to the general direction in which the wiper arm 12 and wiper blade 14 extend in common.

As is shown best in FIG. 4, the end portion 12 of the wiper arm is arranged to straddle, at least partially, the portion of the main bridge of the screen wiper blade 14 which is in facing relationship with it, that is to say the portion with which it is aligned in FIG. 1, in such a way that the inner surfaces 28 of the side wings 18 are disposed in facing relationship with the outer surfaces 30 of the side portions 22 of the blade main bridge 14.

Guide elements are provided for the purpose of ensuring transverse guiding of the screen wiper blade 14 with respect to the end portion 12 of the wiper arm. In this connection, each of the side wing portions 18 of the end portion 12 of the wiper arm is extended vertically, below its lower free edge 32, by a vertical lug 34, which is made integrally with the side wing portion 18 that lies in facing relationship with the corresponding side portion 22 of the windshield wiper blade 14.

The end portion 12 of the windshield wiper arm, and the wiper blade 14, have a general symmetry of design about a median longitudinal plane P which can be seen in FIG. 3, while each of the two lugs 34 carries a transverse guide element 36 which is made, in the form of a channel, from a suitable plastics material which is such as to deaden noise. Each of these guide channel members 36 has, essentially, two parallel flat faces, namely an outer face 38E and an inner face 38I. Each of the inner faces 38I of the channel members 36 constitutes the guide element itself, in the sense of the present invention. It is received between, on the one hand, the inner surface 28 of the side wing portion 18 of the end portion 12 of the wiper arm, and, on the other hand, the outer surface 30, in facing relationship with the surface 28, of the side portion 22 of the wiper blade 14. Each of these guide channel members 36 is held in hooked relationship on the corresponding lug 34 by means of a hook element 40 which can be seen in FIG. 3.

The aerodynamic deflector 16 is a component made, from a suitable plastics material, in the form of a deflecting strip 42. The deflector 16 is secured on the remainder of the windshield wiper 10 by fastening means which comprise two fastening yokes 44 which are made integrally with the deflector 16 by moulding. One of these yokes can be seen in FIGS. 5 and 6, to which reference is now made.

Each fastening yoke 44 has a transverse cross section which is substantially in the form of an inverted U, comprising two parallel side wall portions 46 joined together by a horizontal spine portion 49 at the top. The yoke 44 straddles a corresponding part of the main bridge of the screen wiper blade 14, as can be seen in FIG. 5 and FIG. 6. Each fastening yoke 44 is joined to the deflecting strip 42 by means of a connecting lug element 48, which is made integrally with both the strip 42 and the yoke 44 by moulding.

In the modified embodiment seen in FIG. 6, the fastening yoke 44 that lies facing towards the end portion 12 of the wiper arm comprises, in its connecting lug element 48, an open hole 50 which is arranged to receive a guide finger 52. This guide finger 52 is formed on the end portion 12 of the wiper arm which is in facing relationship with it. To this end, and as is best seen in FIGS. 6 to 8, the guide finger 52 projects vertically from the lower edge 32 of the corresponding side wing portion 18 of the end portion 12 of the wiper arm. It is received in the through hole 50, thus indirectly guiding the wiper blade 14 transversely with respect to the end portion 12 of the wiper arm.

In the modified embodiment shown in FIG. 8, it can be seen that the guide finger 52 may be provided with a sheath or channel member 54 which is fitted over the guide finger 52, to which it is held fast by means of hook elements 56.

In accordance with a further modification, of a known kind and not shown in the drawings, the aerodynamic deflector 16 may also be fixed to the wiper blade 14 and the free end of the arm end portion 12 by means of a suitable articulating connector arranged in its middle part.

In the various embodiments which have been described above, direct or indirect transverse guide means are provided for guiding the wiper blade 14 with respect to the wiper arm, and it can be seen that these guide means are of a particularly simple design and that they are independent from the means whereby the wiper blade 14 is articulated on the wiper arm.

What is claimed is:

1. A motor vehicle screen wiper comprising:

an elongated wiper arm having a lengthwise direction, the wiper arm having an elongated arm end portion with a transverse cross-section in the form of an inverted U, said arm end portion including a free end thereof;

an elongated wiper blade main bridge having an outer surface thereon;

the arm end portion at least partly straddling the outer surface of the wiper blade main bridge, the wiper blade main bridge being pivoted to the free end of the arm end portion, the arm end portion having guide means for guiding the wiper blade main bridge transversely with respect to the wiper arm, and wherein the U-shaped arm end portion defines two parallel side wing portions;

said guide means has at least one of said wing portions carrying a transverse guide element engaging with said main bridge for the transverse guiding of the wiper blade main bridge with respect to the wiper arm, the side wing portions each having a respective inner surface, the inner surfaces being in oppositely facing relationship with each other, the transverse guide element being interposed between its respective wing portion inner surface and the wiper blade main bridge outer surface, wherein each said side wing portion defines a free edge thereof, a lug protruding from at least one of the free edges, wherein the transverse guide element has a guide channel member receiving the lug therein.

2. A screen wiper according to claim 1, further including hooking means for attaching the transverse guide element on the lug.

3. A screen wiper according to claim 1, wherein the wiper arm defines a median longitudinal plane, the wiper arm being symmetrical about the longitudinal plane, and each wing portion carries a transverse guide elements, each guide element being interposed between a respective wing portion inner surface and the wiper blade main bridge outer surface associated therewith.

4. A screen wiper according to claim 1, further including an elongated aerodynamic deflector extending longitudinally over at least part of the length of the wiper blade main bridge, the aerodynamic deflector including at least one transverse fastening yoke straddling the wiper blade, the yoke being in facing relationship to the end portion of the screen wiper arm, with the transverse guide element interposed between the screen wiper arm and the aerodynamic deflector.

5. A motor vehicle screen wiper comprising:

an elongated wiper arm having a lengthwise direction, the wiper arm having an elongated arm end portion with a transverse cross-section in the form of an inverted U, said arm end portion including a free end thereof;

an elongated wiper blade main bridge having an outer surface thereon;

the arm end portion at least partly straddling the outer surface of the wiper blade main bridge, the wiper blade main bridge being pivoted to the free end of the arm end portion, the arm end portion having guide means for guiding the wiper blade main bridge transversely with respect to the wiper arm, and wherein the U-shaped arm end portion defines two parallel side wing portions, the side wing portions each having a respective inner surface, the inner surfaces being in oppositely facing relationship with each other;

said guide means having at least one of said wing portions carrying a transverse guide element for the transverse guiding of the wiper blade main bridge with respect to the wiper arm;

an elongated aerodynamic deflector extending longitudinally over at least part of the length of the wiper blade main bridge, the aerodynamic deflector including at least one transverse fastening yoke straddling the wiper blade main bridge and securing the deflector thereto via a lug, said lug has a hole therethrough, the yoke being in facing relationship to the end portion of the screen wiper arm with the transverse guide element interposed between the screen wiper arm and the aerodynamic deflector, wherein the transverse guide element comprises a guide finger extending from said at least one wing portion, said finger is received in said through hole.

6. A screen wiper according to claim 5, wherein the wiper arm end portion parallel side wing portions, each establishing a respective free edge thereof, with the guide finger extending from the edge.

7. A screen wiper according to claim 1, further including a sheath of sound deadening material covering the guide finger.

8. A screen wiper according to claim 5, wherein the aerodynamic deflector has a middle part and a second transverse fastening yoke straddling the screen wiper blade, the two yokes being on either side of the deflector middle part.

\* \* \* \* \*